July 9, 1963
R. O. RASMUSSEN
3,097,299
INFRARED PICKOFF DEVICE
Filed July 18, 1960
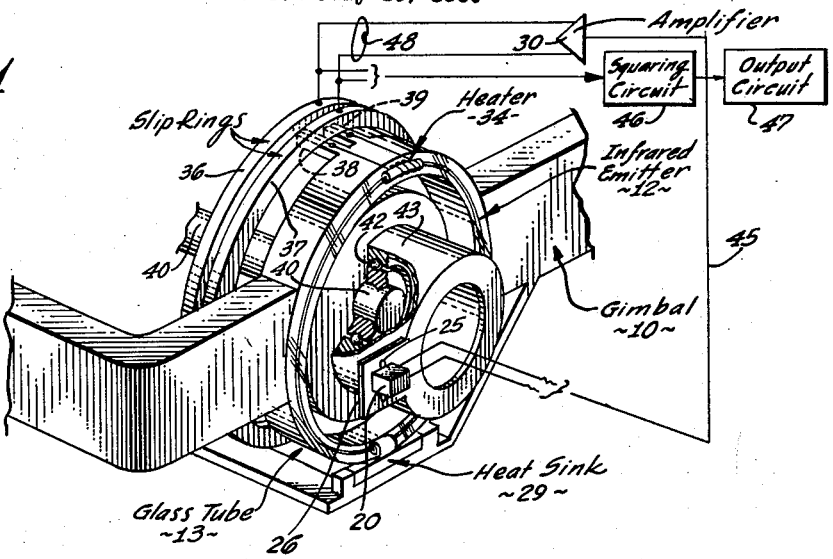
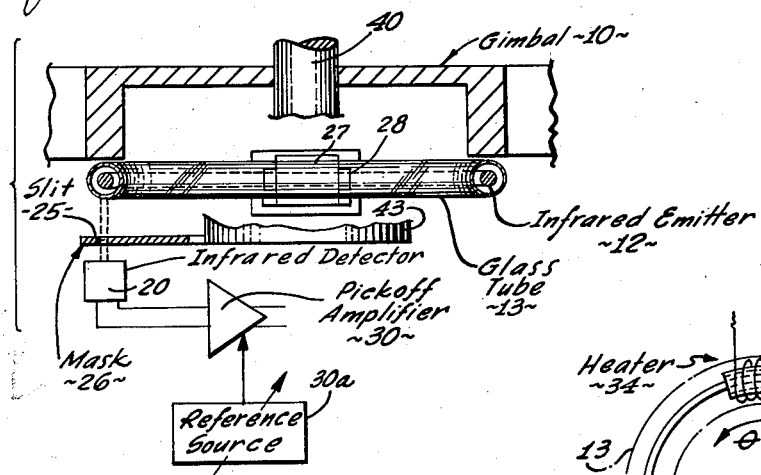
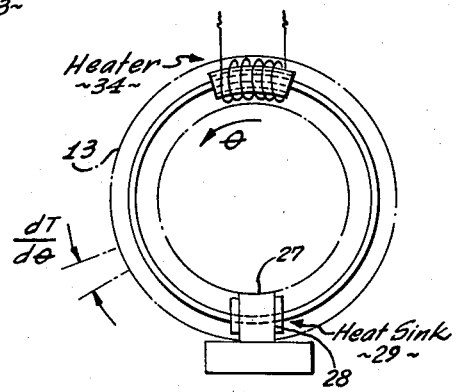
INVENTOR:
Richard O. Rasmussen
By Smyth, Roston & Pavitt
Attorneys.

United States Patent Office 3,097,299
Patented July 9, 1963

3,097,299
INFRARED PICKOFF DEVICE
Richard O. Rasmussen, Van Nuys, Calif., assignor to Telecomputing Corporation, Van Nuys, Calif., a corporation of California
Filed July 18, 1960, Ser. No. 43,518
12 Claims. (Cl. 250—83.3)

This invention relates to apparatus for determining the position of a movable member and, more particularly, to an infrared pickoff for a gyroscope gimbal or like rotatable member.

A pickoff is a device which produces an output signal from the intelligence developed by a sensor. The intelligence may be the angular position of a gyroscope gimbal with respect to a frame supporting a gimbal. A number of different types of pickoffs have been utilized in conjunction with gyroscopes. The majority of these types of pickoffs are electrical as, for example, selsyns, potentiometers, reluctance pickoffs and capacitance pickoffs. Pneumatic devices have also been utilized for a few applications. Each of these types of pickoffs have particular characteristics making them suitable for specific applications, and unsuitable for others. The limiting characteristics of these pickoffs relate either to the friction introduced by the coupling or to relatively low resolution capabilities. Further, for rocket and space vehicle applications, size and weight factors may be a limiting characteristic.

In a specific illustrative embodiment of this invention, a pickoff is provided which does not utilize a frictional coupling and which has infinite resolution possibilites. Moreover, the components of the pickoff are extremely small and light weight. The pickoff is an infrared pickoff and includes an infrared detector element mounted on the frame supporting a gyroscope gimbal and a thermal conductor mounted on the gimbal which functions as an infrared radiation emitter. The temperature along the infrared emitter varies from a maximum at a heater coupled to one position of the emitter to a minimum at a heat sink coupled to another position of the emitter. The infrared emitter may be in the form of a ring enclosed in a glass tube. The tube reduces convection losses so that the variation of temperature with angular distance, or thermal gradient, around the emitter is relatively constant. Due, however, to radiation losses, the variation of temperature change with angular distance is not exactly constant even if the conductivity characteristic of the emitter is linear. The radiated energy from the emitter passes through a slit in a scanning mask in front of the detector element. As the gimbal rotates with respect to the frame, different small areas of the emitter are rotated in front of the scanning mask. The output of the detector element varies with the amount of radiated energy received through the mask and, accordingly, is an indication of the angular position of the gimbal.

Due, however, to the non-linearities because of the inevitable radiation, and also because of non-linearities introduced by the detector element itself, the output of the detector element is inherently non-linear with respect to the angular position of the gimbal.

Features of this invention relate to the provision of means for providing a linear infrared pickoff in which the non-linear factors due to radiation and due to the characteristics of the detector are compensated. The linearity is achieved utilizing a nulling system in which the output of the detector element is coupled through amplifier means and slip rings to the heater thermally coupled to the infrared ring emitter. The temperature of the heater and throughout the emitter is, accordingly, varied in accordance with the output of the detector in a direction such as to maintain the same temperature for viewing by the detector. The energy to the ring emitter and, accordingly, the power to the heater is, accordingly, a measure of the angular position of the gyroscope gimbal on the frame. The current to the heater is sampled and introduced to a squaring circuit for providing a signal related to the square of the current or the power to the heater. The signal from the squaring circuit is, therefore, a direct indication of the angular position of the gyroscope gimbal.

Further advantages and features of this invention will become apparent upon consideration of the following description when read in conjunction with the drawing wherein:

FIGURE 1 is a partial perspective view and partial functional representation of the infrared pickoff of this invention utilized for measuring the angular position of a gyroscope gimbal;

FIGURE 2 is a sectional view vertically through the infrared pickoff of FIGURE 1; and FIGURE 3 is a functional representation of the infrared ring emitter utilized in the infrared pickoff of this invention.

Referring to FIGURES 1 through 3, the infrared pickoff measures the angular position of a gyroscope gimbal 10. An infrared emitter 12 is mounted on the gyroscope gimbal 10 so as to rotate therewith respect to a stationary cylindrical member 43 which may be part of the support frame for the gyroscope gimbal 10. The gimbal 10 is supported on a shaft 40 which rotates in the cylindrical member 43. The angular position of the gimbal 10 with respect to the member 43 is determined by the infrared pickoff including the infrared emitter 12.

The infrared emitter 12 is made of good thermally conductive material such as aluminum or copper, and it provides a thermal gradient from a high point at its upper end to a low point at its lower end. The emitter 12 is heated at its upper end by a heater 34 which is thermally coupled thereto. The heater is energized over a path through a pair of brushes 38 and 39 mounted with the heater 34 and the emitter 12 of the gimbal 10. The brushes 38 and 39 respectively engage two slip rings 36 and 37 which are stationary and which may be structurally connected to the stationary cylindrical member 43. An electrical current from an amplifier 30 is introduced through the slip rings 36 and 37 and the brushes 38 and 39 to the heater 34 to heat the upper end of the infrared ring 12.

As mentioned above, the emitter 12 may be made of high thermally conductive material such as aluminum or copper. The wire forming the emitter 12 may illustratively be gage #16 conductor having a diameter of 0.051 inch and a cross sectional area of 0.160 square inch. The diameter of the emitter 12 formed by the thermally conductive wire may be quite small, illustratively, 1 inch. The emitter 12 is enclosed in a transparent cylindrical tube 13. The tube 13 may illustratively be made of a high temperature glass.

The heater 34, which is thermally coupled to the emitter 12, provides for a high temperature, illustratively of approximately 600 degrees centigrade, at the upper end of the infrared emitter 12. The temperature reduces angularly in both directions along the infrared emitter 12 in the tube 13 until the cylindrical sleeve 27 at the bottom of the circular infrared emitter is reached. The sleeve 27 which is also made of high thermally conductive material engages and is in good thermal contact with the infrared wire emitter 12. The sleeve 27 together with a bracket 28 functions as a heat sink generally indicated at 29 for the heat introduced by the heater 34, and the temperature at the heat sink 29 for a 600° C. temperature at the heater 34, may be 300° C. The bracket 28 and the infrared emitter 12 are supported on the gyroscope gimbal 10 and, accordingly, rotate therewith with respect to the stationary member 43.

The stationary member 43 supports a mask 26 having a scanning slit 25. An infrared detector element 20 is positioned over the slit 25 of the mask 26 and is attached to the mask 26. The infrared detector element 20 views a small position of the infrared emitter 12 through the slit 25. As the angular position of the gyroscope gimbal 10 changes with respect to the stationary member 43, the position on the infrared emitter 12 viewed by the detector element 20 changes in accordance therewith.

The infrared detector element 20 may be a bolometer type detector or a photoconductor type detector. A bolometer detector generally includes a wire or strip exposed to the radiation which changes in resistance in accordance therewith. This type of detector has a relatively flat response of a wide range of radiation frequencies so that its response is relatively linear with respect to the scanned temperature of the emitter 12.

Photoconductor type detectors, however, have much greater detectivity than the bolometer type detectors. As is hereinafter described, the radiation from the emitter 12 causes a non-linear variation of temperature with angular position of the emitter 12. To reduce this non-linear factor, it is desirable to utilize lower temperatures, and accordingly greater detectivity is highly advantageous. The detectivity of photoconductor type detectors utilizing, for example, a lead selenide surface, is roughly $5 \times 10^8 \sqrt{cm.}/watt\text{-}sec.^2$, whereas a common figure for bolometer types is only $10^8 \sqrt{cm.}/watt\text{-}sec.^2$. Other semiconductors such as lead sulfide and indium antimonide have two and three orders of magnitude better detectively than bolometer type detectors. In the specific illustrative embodiment of this invention a photoconductor type detector is accordingly utilized. In addition to the linearity advantage of lower temperatures, the photoconductor types have the additional advantage of not requiring cooling.

As the photoconductive detector 20 views progressively hotter sections or areas of the wire emitter 12, more energy, in the form of radiated photons, is available at the sensitive surface of the detector 20. The resistivity of the detector 20 and its resultant output signal does not, however, vary linearly with temperature. This non-linearity factor is additive with respect to the non-linearity in the incremental temperature variations around the wire emitter 12 due to the radiation. At 600° C. the wavelength of maximum radiation to the detector 20 is 3.3 microns, and a gray body (the emitter 12) with an emissivity of 0.5 would radiate 1.65 watts/cm.² at 600° C. For 300° C., the wavelength of maximum radiation is 5 microns and the radiation is 0.3 watt/cm.². The values provide good resolution and signal-to-noise ratio.

The resolution is quite high and a theoretical infinite resolution is possible because the temperature does not vary in any discrete steps along the emitter 12 but varies continuously. The resolution depends upon the dimensions of the slit 25 in the mask 26 and upon the sensitivity of the detector 20.

The infrared detector 20 provides a signal through the leads 45 to the amplifier 30 briefly mentioned above. The amplifier 30 controls the current provided through the slip rings 36 and 37 and the brushes 38 and 39 to the heater 34. More or less heat is, accordingly, provided by the heater or heat source 34 in accordance with the output of the amplifier 30 to the infrared emitter 12. The amplifier 30 is adjustable to vary the reference level which determines the output current from the amplifier 30. A reference source 30A may be part of the amplifier for providing a signal with which the signal from the detector element 20 is compared. The current from the amplifier 30 represents the difference between the detector output and the reference. Thus, regardless of the position of the emitter 12 relative to the detector 20, the system dissipates more or less power such that the detector 20 is always viewing the same amount of energy. The power to the heater 34 is varied in a direction such as to maintain the energy input to the detector 20 constant. Since the conductive temperature gradient changes in a linear fashion along the emitter 12 and since power dissipated is proportional to the square of the current ($I^2R$), the current through the heater 34 is monitored to provide an indication of the position of the gyroscope gimbal 10. The current to the heater 34 is sampled by the output provided to leads 48 coupled to a squaring circuit 46. The output from the circuit 46 is proportional to the square of the current to the heater 34 and, accordingly, indicates the angular position of the gimbal 10 with respect to the member 43.

The heat time constant of the heater 34 and the time to achieve thermal equilibrium within the infrared emitter are designed to be brief so that an adequate frequency response is possible. The output is not affected by the spectral response of the detector 20 nor the non-linear radiation characteristics of the infrared emitter 12.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. An infrared pickoff for measuring the angular position of a rotatable member, including, a circular wire for emitting infrared radiation mounted on said rotatable member, a heater on said rotatable member and thermally coupled to said wire at one position of the wire, a heat sink thermally coupled to the wire at another position of the wire, and a stationary infrared detector positioned opposite the wire for viewing a small portion of the wire in accordance with the angular position of the rotatable member.

2. An infrared pickoff for measuring the angular position of a rotatable member, including, a circular wire for emitting infrared radiation mounted on said rotatable member, a heater on said rotatable member and thermally coupled to said wire at one position of the wire, a heat sink thermally coupled to the wire at another position of the wire, a stationary infrared detector positioned opposite the wire for viewing a small portion of the wire in accordance with the angular position of the rotatable member, an amplifier coupled to said detector for amplifying the output of said detector, a slip ring connection between said amplifier and said heater for introducing the output of said amplifier to said heater, and output means coupled to said amplifier.

3. An infrared pickoff for measuring the angular position of a rotatable member, including, a circular wire for emitting infrared radiation mounted on said rotatable member, a heater on said rotatable member and thermally coupled to said wire at one position of the wire, a heat sink thermally coupled to the wire at another position of the wire, a stationary infrared detector positioned opposite the wire for viewing a small portion of the wire in accordance with the angular position of the rotatable member, an amplifier coupled to said detector for amplifying the output of said detector, a slip ring connection between said amplifier and said heater for introducing the output of said amplifier to said heater, a squaring circuit coupled to said amplifier for providing a signal related to the square of the electrical current provided from said amplifier, and output means coupled to said squaring circuit for receiving the signal from said squaring circuit.

4. A high resolution pickoff for measuring the relative angular position between two members at least one of which is rotatable with respect to the other, a wire supported on one of said members, means supported on said one member and thermally coupled to one end of the wire for heating said one end of the wire, a heat sink supported on said one member and thermally coupled to the other end of said wire for dissipating heat conducted through the wire from said heating means whereby a thermal gradient is established along the wire from said one end to said other end, and means supported on the other member relative to the wire for movement along the wire responsive to relative rotation between the two members, said last-mentioned means including infrared detecting means for providing an indication of the infrared energy radiated from any small incremental area of the wire along which the infrared detecting means is positioned.

5. A high resolution pickoff in accordance with claim 4, including, in addition a glass tube enclosing said wire and supported on said one member for reducing heat convection losses from said wire.

6. A high resolution pickoff in accordance with claim 4, including, in addition circuit means connected between said detecting means and said heating means and including an amplifier whereby the heat developed by said heating means is varied in accordance with the relative position of the two members.

7. A high resolution pickoff for measuring the relative angular position between two members at least one of which is rotatable with respect to the other, a wire supported on one of said members, means supported on said one member and thermally coupled to one end of the wire for heating said one end of the wire, a heat sink supported on said one member and thermally coupled to the other end of said wire for dissipating heat conducted through the wire from said heating means whereby a thermal gradient is established along the wire from said one end to said other end, means supported on the other member relative to the wire for movement along the wire responsive to relative rotation between the two members, said last-mentioned means including infrared detecting means for providing an indication of the infrared energy radiated from any small incremental area of the wire along which the infrared detecting means is positioned, circuit means connected between said detecting means and said heating means and including an amplifier whereby the heat developed by said heating means is varied in accordance with the relative position of the two members, and a squaring circuit coupled to said amplifier for providing a signal related to the square of the current from said amplifier to said heating means.

8. A high resolution pickoff for providing an indication of the relative position of a movable member relative to a stationary member, including, an elongate element of high thermal conductivity supported on one of said members, adjustable means thermally coupled to said elongate element for establishing a thermal gradient along said elongate element, infrared detecting means supported on the other of the members so as to be movable with said other member relative to the elongate element for providing an electrical signal related to the infrared radiation from any small area of the elongate element, and means coupled to said detecting means for adjusting the adjustable means in accordance with the electrical signal from said detecting means by an amount and direction such as to maintain the radiated energy to said detecting means substantially constant.

9. A pickoff for measuring the relative position between two members at least one of which is movable with respect to the other, first means supported on one of said members and constructed to emit progressive amounts of heat at progressive positions along the member, second means supported on the other one of said members and disposed relative to the first means to detect the energy emitted by the first means at a restricted position on the first means in accordance with the relative movements between the first and second members, and third means operatively coupled to the second means to provide an indication of the heat detected by the second means.

10. A pickoff for measuring the relative position between two members at least one of which is movable with respect to the other, first means constructed to receive an electrical current and to generate an amount of energy dependent upon the magnitude of the electrical current, second means disposed in cooperative relationship with the first means and supported on a first one of the members in an elongated relationship along the member for providing a progressively decreasing radiation of energy at progressive positions along the second means in accordance with the amount of energy generated by the first means, third means supported on the second member and disposed relative to the second means to detect the amount of energy radiated by the second means from a limited area on the second means where the limited area is dependent upon the relative movement between the first and second members, fourth means operatively coupled to the first and third means for varying the current introduced to the first means to maintain at a particular level the energy detected by the third means, and fifth means operatively coupled to the fourth means for measuring the current introduced to the fourth means to provide an indication as to the relative movements between the first and second members.

11. A pickoff for measuring the relative position between two members at least one of which is movable with respect to the other, means including a heater for receiving an electrical current and for generating an amount of heat dependent upon the magnitude of the electrical current, an element supported on a first one of the members in an elongate disposition along the member and disposed in cooperative relationship with the heater for receiving the heat from the heater and for radiating such heat at a progressively decreasing gradient at progressive positions in the elongate direction, and means including a detector supported on the second member and disposed relative to the element for detecting the amount of heat radiated from the element at a discrete and limited position in the elongate direction where the discrete and limited position is dependent upon the relative movements between the first and second members.

12. The pickoff set forth in claim 11 in which a slitted mask is disposed between the element and the detector to obtain a radiation of heat to the detector from only the discrete and limited position on the element.

References Cited in the file of this patent
UNITED STATES PATENTS

| | | |
|---|---|---|
| 2,369,622 | Toulon | Feb. 13, 1945 |
| 2,424,193 | Rost et al. | July 15, 1947 |
| 2,431,625 | Tolson | Nov. 25, 1947 |
| 2,856,778 | Kiebert | Oct. 21, 1958 |
| 2,978,622 | Wittke | Apr. 4, 1961 |
| 2,991,659 | Bowden | July 11, 1961 |